United States Patent [19]

Fournillon et al.

[11] Patent Number: 5,036,878
[45] Date of Patent: Aug. 6, 1991

[54] GAS-CYLINDER RELIEF VALVE

[75] Inventors: Claude Fournillon, Genlis; Alain Noblot, Dijon, both of France

[73] Assignee: Societe de Mecanique des Tilles "S.M.T." S.A., France

[21] Appl. No.: 582,490

[22] Filed: Sep. 14, 1990

[30] Foreign Application Priority Data

Sep. 22, 1989 [FR] France ............... 89 12502

[51] Int. Cl.⁵ ............................ F16K 17/04
[52] U.S. Cl. .................. 137/493.9; 137/505.25; 137/614.19
[58] Field of Search ............ 137/493, 493.8, 493.9, 137/505.25, 505.42, 614.19

[56] References Cited

U.S. PATENT DOCUMENTS

| 2,162,096 | 6/1939 | Marmorek | 137/614.19 X |
| 2,969,081 | 1/1961 | Pipes | 137/493 X |
| 3,911,988 | 10/1975 | Richards | 137/505.25 X |
| 3,978,880 | 9/9176 | Crown et al. | 137/505.42 X |
| 4,008,716 | 2/1977 | Amlong | 137/614.19 X |
| 4,099,538 | 7/1978 | Curtis | 137/505.42 X |

FOREIGN PATENT DOCUMENTS

| 1256980 | 6/1962 | Fed. Rep. of Germany . |
| 1220688 | 6/1966 | Fed. Rep. of Germany . |
| 8604022 | 2/1986 | Fed. Rep. of Germany . |
| 7630742 | 10/1976 | France . |
| 2122729 | 7/1982 | United Kingdom . |

Primary Examiner—Stephen M. Hepperle
Attorney, Agent, or Firm—Leydig, Voit & Mayer

[57] ABSTRACT

The relief valve is designed so as to make it possible for a cylinder to be filled with a gas and to enable this gas to be drawn off at a relatively low and stabilized pressure. In order to make the filling possible through the pressure-relief device, the relieving piston (34) has a bypass pipe (52) passing through it and is linked on the upstream side and on the downstream side with two valves (18) and (28) which enable the cylinder to be filled.

6 Claims, 1 Drawing Sheet

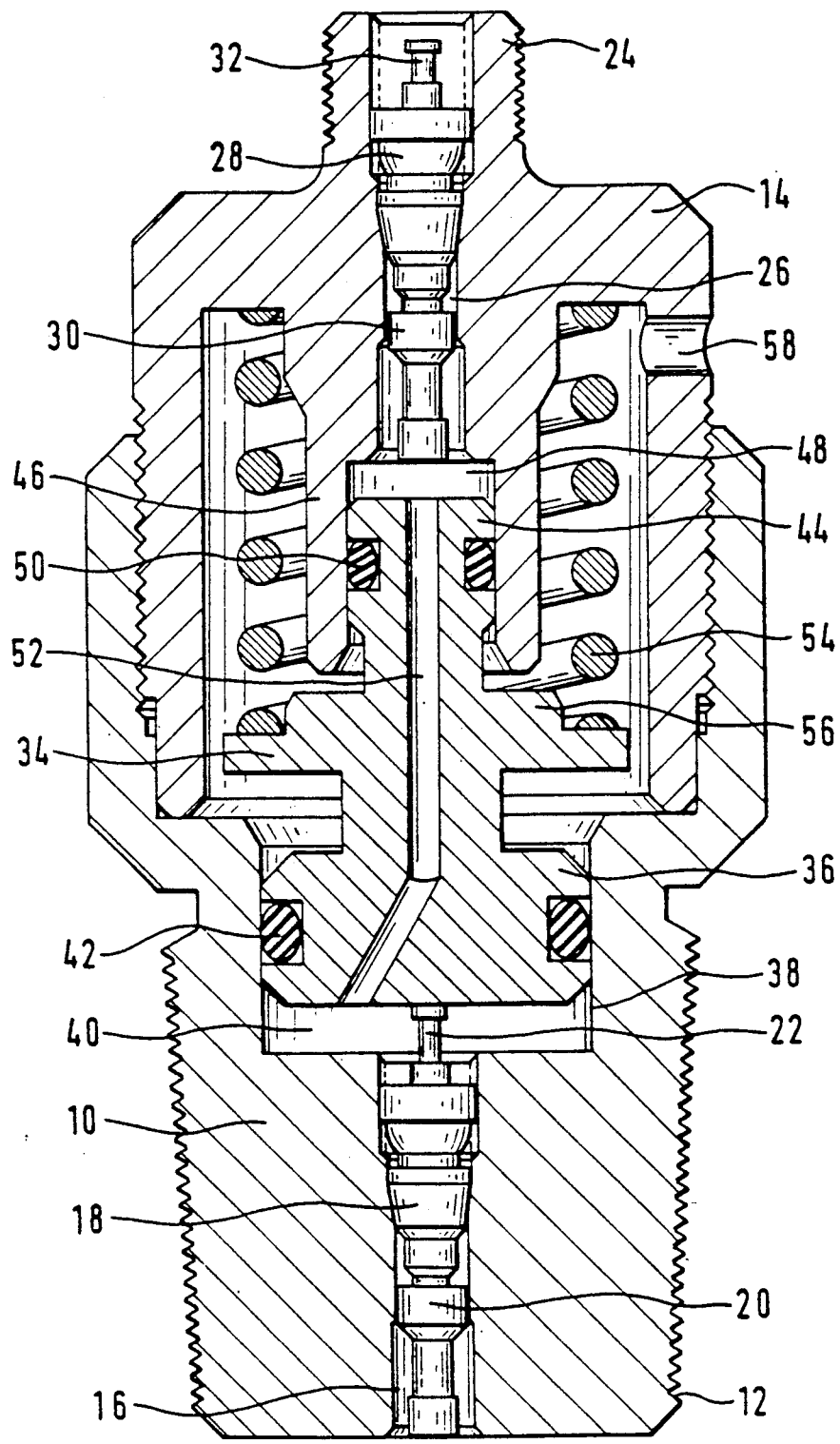

GAS-CYLINDER RELIEF VALVE

The present invention relates to a gas-cylinder relief valve comprising a body designed to be screwed onto a gas cylinder, and a piston which is mounted in a floating and leaktight manner in a bore of the body and exposed, on the upstream side, to the gas pressure in the cylinder and, on the downstream side, opposite the upstream side, to the action of a spring whose force determines the degree of gas pressure relief.

Relief valves o this type are well known per se. They are used wherever the gas is stored at a pressure greater than its use pressure and serve to reduce the gas pressure to a determined and, preferably, stabilized value. This is the case, for example, with gas cylinders. These relief valves are generally parts of the use circuit, because they must be regulated and designed as a function of the use pressure.

Now, it would be advantageous likewise to provide a relief valve on the cylinders so as to ensure a prior pressure relief of the gas and not be obliged, when filling a cylinder, to have to take account of the use pressure or the performance of the relief valves of the use circuits. This would make it possible, for example, to compress the gas in the cylinder to a greater extent when filling; in other words, with the capacity of the cylinder being equal, to increase its content, i.e. the quantity of gas, or, when the content is equal, to reduce the size of the cylinder.

Unfortunately, the mounting of the relief valves directly on the cylinders requires, more often than not, their demounting with a view to filling the cylinder, or a second orifice on the cylinder because the filling cannot be carried out via the relief valves, these only enabling a unidirectional circulation of the gas.

The aim of the present invention is to provide a new relief valve for a cylinder or receiver, which, in addition to its functions of relieving the gas pressure and enabling the gas to be drawn off at a reduced and stabilized pressure, makes it possible to fill the cylinder by means of the relief valve and without demounting the latter.

In order to attain this objective, the relief valve proposed by the present invention is essentially characterized by a bypass pipe making it possible for the cylinder to be filled and gas to be drawn off from the latter and connecting the said upstream and downstream sides of the piston to one another, the section of the downstream side exposed to this bypass pipe being smaller than that of the upstream side, and in that the upstream and downstream sides of the piston communicate respectively with a the inside of the cylinder and with a use system, by means of a first and a second valve, both designed so as to be maintained in a closed position by the gas pressure in the cylinder and to be opened, the first either by the mechanical action exerted by the upstream side of the piston, or by the pressure of a gas during filling of the cylinder, and the second either by the connection, on the body of the relief valve, of a connector of a pipe, or by the pressure of a gas for filling the cylinder. The said bypass pipe preferably proceeds through the body of the piston.

The spring may be mounted in a detachable cap, bearing on the one hand in the base of the cap and on the other hand on a peripheral shoulder of the piston. The spring is preferably mounted about a sleeve which is secured to the base of the cap, this sleeve extending from the latter in the direction of the piston.

A narrowed part of the piston of the region on the downstream side extends inside the said sleeve, with the possibility of axial sliding in a leaktight manner by virtue of an O-ring seal.

The second valve is preferably mounted axially at the center of the base of the cap in a bore extending between the inside of the said sleeve and an outer connecting piece.

Other special features and characteristics will emerge from the detailed description of an advantageous embodiment, which is presented hereinbelow by way of illustration with reference to the appended FIGURE which illustrates diagrammatically an axial section through a relief valve in accordance with the present invention.

The relief valve shown in this FIGURE comprises a body 10 whose lower part is provided with an outer thread 12 enabling it to be screwed onto a gas cylinder (not shown) and whose upper part has a cavity in which a cap 14 is screwed. The lower part of the body 10 has an axial pipe 16 passing through it in which is screwed a first valve 18 similar to an inner-tube valve, which is maintained in a closed position at a seal 20, under the effect of the gas pressure in the cylinder, but which opens, either under the effect of an axial thrust on the upper rod 22 thereof, or under the effect of a differential pressure, when the pressure on its upper part exceeds the gas pressure in the cylinder in the case of filling.

The cap 14 has a central connecting head 24 through which there runs an axial passage 26 in which is screwed a second valve 28 identical to the first valve 18 and also comprising a seal 30 for closing the passage 26, and a manoeuvring rod 32. The active element of the relief valve is a piston 34 which is mounted axially in a floating manner in the cavity of the body 10 and of the cap 14. This piston 34 comprises a cylindrical base 36 housed in a cylindrical bore 38 of the base of the cavity of the body 10 and which defines with the upstream side of the base 36 of the piston 10 a lower chamber 40 whose leaktightness is ensured by an O-ring seal 42 provided around the base 36 of the piston 34. The head 44 of the piston 34 is inserted into a cylindrical axial sleeve 46 secured to the cap 14 and bounding with the latter an upper chamber 48 whose leaktightness is ensured by an O-ring seal 50 around the head 44 of the piston 34.

The upper 48 and lower 40 chambers intercommunicate via a channel 52 passing through the piston 34, so that these two chambers are always equilibrated from the point of view of pressure. However, given that the section of the base 36 of the piston 34 is greater than the section of the head 44, the piston 34 is subjected, when the two chamber 40 and 38 are under pressure, to a differential pressure which produces an upward force on the piston 34.

In the annular space between the sleeve 46 and the wall of the cap 14 there is a helical spring 54 bearing, on the upper side, on the cap 14 and, on the lower side, on a peripheral shoulder 56 of the piston 34. This spring 54 is calibrated so as to exert a determined downward force on the piston 34.

The reference numeral 58 designates an orifice which makes it possible for atmospheric pressure to be applied to the space in which the spring 54 is located.

The operating of this relief valve will now be described, both for the filling of the cylinder and for the drawing off of the gas.

As far as filling is concerned the relief valve is connected, by means of the connection 24, to a source of pressurized gas. Under the effect of the gas pressure, the valve 28 opens and the gas spreads through the channel 52 into the chamber 40 so as to open, as a result of its pressure, also the valve 18 and to penetrate into the cylinder. At the end of filling, the connection 24 is disconnected from the gas source. The gas pressure then prevailing in the cylinder maintains the valve 18 in a closed position while the pressure in the chambers 40 and 48 on the upstream and downstream side of the piston 34 ensures the closing of the valve 28. In addition, the thrust brought about by the gas pressure in the chamber 40 is sufficient to overcome the force of the spring 54 and that of the gas pressure, on the downstream side, on the head 44 of the piston 34, so that the latter is raised against the action of the spring 54 and does not act upon the rod 22 for opening the valve 18.

As far as the drawing off is concerned, the connection 24 is connected to a distribution or use circuit for the gas. This connection is designed in such a way that, once it has been implemented, it acts permanently on the rod 32 of the valve 28 so as to maintain the latter in an open position. Under the effect of the opening of the valve 28, the gas previously contained in the chambers 40 and 48 will leak into the distribution circuit, and the reduction of the pressure in the chamber 40 releases the upstream side of the piston 34, with the result that the spring 54 will be able to slacken so as to cause the piston 34 to descend and to push down the rod 22, thus causing the opening of the valve 18. The escaping of the gas through the valve 18 will again increase the pressure in the chamber 40, and this pressure increase will be sufficient to cause the piston 34 to rise again against the action of the spring 54 so as to release the rod 22 and close the valve 18.

The gas in the chamber 40 will continue nonetheless to flow through the channel 52 and the open valve 28 into the use circuit, with the result that the pressure decreases again in the chamber 40 in order to enable the spring 54 to cause the piston 34 to descend again and open the valve 18 by thrusts on the rod 22.

This sequence of operations for opening and closing the valve 18 has, for the needs of the description, been described in "slow motion" but, in practice, these operations are repeated at such a rapid rate that the piston 34 seems to remain immobile in a position determined as a function of the force of the spring and of the gas pressure in the cylinder in order to ensure, in a manner which is known per se, the pressure relief of this gas.

The degree of pressure relief is determined by the force of the spring 54. The stronger the spring, the greater will be the pressure of the pressure-relieved gas.

The gas pressure relief is therefore effected in a manner known per se, but, in contrast to the known relief valve, the relief valve proposed by the present invention makes it possible to fill a cylinder or a receiver via the relief valve.

We claim:

1. Gas-cylinder relief valve comprising a body (10) designed to be screwed onto a gas cylinder, and a piston (34) which is mounted in a floating and leaktight manner in a bore of the body (10) and exposed, on the upstream side, to the gas pressure in the cylinder and, on the downstream side opposite the upstream side, to the action of a spring (54) whose force determines the degree of pressure relief, characterized by a bypass pipe (52) making it possible for the cylinder to be filled and gas to be drawn off from the latter and connecting the said upstream and downstream sides of the piston (34) to one another, the section of the downstream side exposed to this bypass pipe (52) being smaller than that of the upstream side, and in that the upstream and downstream sides of the piston (34) communicate respectively with the inside of the cylinder and with a use system, by means of a first valve (18) and a second valve (28), both designed so as to be maintained in a close deposition by the gas pressure in the cylinder and to be opened, the first (18) either by the mechanical action exerted by the upstream side of the piston (34), or by a gas pressure during filling of the cylinder, and the second (28) either by connection, on the body (10) of the relief valve, of a connector of a pipe of a use circuit, or by the pressure of a gas for filling the cylinder.

2. Relief valve according to claim 1, characterized in that the bypass pipe (52) passes through the piston (34).

3. Relief valve according to claim 1, characterized in that the said spring (54) is mounted in a detachable cap (14) and bears on the one hand in the base of the cap (14) and on the other hand of a peripheral shoulder (56) of the piston (34).

4. Relief valve according to claim 4 (sic), characterized in that the spring (54) surrounds a sleeve (46) which is secured to the base of the cap (14) and extends from the latter in the direction of the piston (34).

5. Relief valve according to claim 4, characterized in that the narrowed head (44) of the piston (34) of the region of the downstream side of the piston extends inside the said sleeve (46), with the possibility of axial sliding in a leaktight manner by virtue of an O-ring seal (50).

6. Relief valve according to claim 3, characterized in that the said second valve (38) is mounted axially at the center of the base of the cap (14) in a passage (26) extending between the inside of the said sleeve (46) and an outer connecting piece (24).

* * * * *